United States Patent [19]

Stoeppler et al.

[11] 4,203,840

[45] * May 20, 1980

[54] METHOD OF AND APPARATUS FOR CENTRIFUGAL SEPARATION OF LIQUID PHASES

[75] Inventors: Markus Stoeppler, Jülich, Fed. Rep. of Germany; Ivan Havezov, Sofia, Bulgaria

[73] Assignee: Kernforschungsanlage Jülich Gesellschaft mit Beschränkter Haftung, Juülich, Fed. Rep. of Germany

[ * ] Notice: The portion of the term of this patent subsequent to May 20, 1996, has been disclaimed.

[21] Appl. No.: 209,882

[22] Filed: Dec. 20, 1971

[30] Foreign Application Priority Data

Mar. 29, 1971 [DE] Fed. Rep. of Germany ....... 2115032

[51] Int. Cl.[2] ............................................. B01D 11/00

[52] U.S. Cl. ...................................... 210/83; 210/513; 233/1 R; 422/101; 422/258

[58] Field of Search ........... 210/83, 84, 512, DIG. 23, 210/21, 78, 513, 515; 233/1 R, 26; 23/269, 292; 209/208

[56] References Cited

U.S. PATENT DOCUMENTS

| | | | |
|---|---|---|---|
| 1,941,859 | 1/1934 | Hall | 210/513 X |
| 2,667,075 | 1/1954 | Blum et al. | 23/292 X |
| 3,481,477 | 12/1969 | Farr | 23/258.5 R |

*Primary Examiner*—William A. Cuchlinski, Jr.
*Attorney, Agent, or Firm*—Karl F. Ross

[57] ABSTRACT

A centrifuge tube for the separation of liquid phases in a liquid/liquid extraction process is provided with a tube reaching below the upper phase and into the lower phase which receives a centrifugally ejectable block. After insertion of the tube and stratification of the liquid phases, the system is again subjected to centrifugation to remove the block and allow the lower phase to be withdrawn, e.g. through a disposable pipette.

10 Claims, 3 Drawing Figures

METHOD OF AND APPARATUS FOR CENTRIFUGAL SEPARATION OF LIQUID PHASES

FIELD OF THE INVENTION

My present invention relates to a liquid/liquid extraction system and to an improved apparatus for separating two liquid phases and enabling withdrawal of all or a sample of an underlying phase without contamination, as well as to a method in liquid/liquid extraction whereby samples or aliquots of a lower phase can be obtained without contamination.

BACKGROUND OF THE INVENTION

Devices and systems for liquid/liquid extraction have been used for many purposes in analytical and purification chemical arts. So for example it is possible to remove all or part of a particular component, i.e. a solute, from a solvent in which the solute has been dissolved, by treating the solution with a solvent having a greater affinity for the solute and which is only limitedly miscible with the first solvent. The system is agitated and allowed to settle whereupon the first solvent and the second solvent separate into layers, the solute having been prepared between them. The physical removal of one layer from the other may involve simple decanting from the other phase—i.e. the less dense phase—although this technique is not widely used because not all of the low-indensity phase can be recovered and a substantial danger of contamination exists.

It is more common, therefore, to provide a separation funnel which consists of a vessel surmounting a stopcock and discharge tube. The stopcock is opened to drain the lower face until the interface reaches the stopcock, the latter being then closed. While this system has significan advantages over simple decanting systems, it is characterized by a distribution coefficient between about 0.05 and 20.

It has been possible to increase the distribution coefficient markedly, e.g. to values between $10^{-3}$, using specially prepared phase-separation papers. This system has however, the disadvantage that an absorption of multivalent ions on the filter paper forming separation medium is unavoidable. When the process is used for trace analysis this is a serious disadvantage.

It has also been known heretofore to separate liquid phases used in solvent extraction by centrifugation. In this system, the liquid/liquid mixture is placed in centrifuge tubes and other vessels of various materials, e.g. glas, quartz, metal, synthetic resin, and accelerated to 2000 G or more whereupon the more dense phase tends to separate from the less dense phase because of the differences in response to centrifugal force which is a function of the mass of the material. Here too it is possible to reach distribution coefficients between $10^{-3}$ and $10^{3}$. These arrangements have, however, an important disadvantage in that it is not possible to recover a sample aliquot or all of a lower phase with a pipette or the like without traversing the upper phase and unavoidably contaminating the sample.

Other centrifuge systems including those operating with continuous phase separation with computer control centrifuges have also been employed but are not satisfactory for various reasons. Perticularly in radioactive activation work, the recovery of substances labeled with radioactive compounds and the separation by liquid/liquid extraction of radioactive substances cannot be effectively carried out in such continuous centrifuges because of the possibility of radioactive contamination and the consequent need for replacing contaminated parts. Furthermore, such continuous systems require more material than may abe available and are not satisfactory for recovery of short-lived radioactive species.

OBJECTS OF THE INVENTION

It is the principal object of the present invention to provide an improved liquid/liquid extraction system whereby the aforementioned disadvantages can be obviated.

It is another object of the invention to provide an apparatus for separating liquid phases whereby an underlying phase can be totally or partially removed or withdrawn without contamination by the overlying phase.

Yet another object of the invention is to provide an improved method of separating liquids as part of a liquid/liquid extraction whereby a sample may be obtained without contamination.

It is also an object of the invention to provide a method of and an apparatus for separating liquid phases which uses economical equipment, is particularly suitable for the extractive separation of high-activity radionuclide mixtures, and can employ discontinuous techniques so as to enable the determination of the distribution coefficient.

SUMMARY OF THE INVENTION

These objects and others which will become apparent hereinafter are attained, in accordance with the present invention, in a method of effecting liquid/liquid extraction whereby a liquid/liquid extraction mixture is formed in a centrifuge tube, the mixture is subjected to centrifugation to stratify the liquid phases, a tube provided with a plug is inserted plugged-end downwardly through the layers and below the surface of the layer to be sampled, the assembly is again subjected to centrifugation to dislodge the plug and communicate the fluid of the layer of interest to the interior of the tube, and the liquid of this layer is then withdrawn through the tube.

In terms of the apparatus or system, therefore, the invention makes use of a known-type of centrifuge tube or vessel having an open end and a closed end, the latter generally being formed with a taper or a narrowing bottom. The open end of the centrifuge tube is closed, in accordance with an important feature of the present invention, with a stopper of a synthetic resin, preferably polyethylene, in which a throughgoing sampling tube is received. This tube is open at both of its ends but, at the end received within the centrifuge tube, is temporarily closed by an axially inserted plug which, under the influence of centrifugal force can be dislodged from the sampling tube.

According to an important feature of the invention, the plug has a greater mass/volume ratio than the sampling tube in which it is received, while the friction force retaining the plug in the sampling tube is much less than the friction force retaining the sampling tube in the stopper. To this end, the sampling-tube plug may be provided with at least an outer layer of a material of a low coefficient of sliding friction, e.g. polytetrafluoroethylene, In order to increase the mass/volume ratio of this plug, moreover, the plug may contain or be composed in part of a material having a relatively high specific gravity, e.g. a metal. Preferably, the plug is composed of a heavy metal, e.g. lead or steel, coated with polytetrafluoroethylene.

The friction fit of the tube within the stopper of the centrifuge vessel permits adjustment of the depth of prevention of the mouth of the sampling tube into the centrifuge vessel and hence allows selection of the layer to be sampled. In all cases, however, the mouth of the sampling tube must be spaced sufficiently from the bottom of the centrifuge tube as to allow the plug to be centrifugally injected.

An important advantage of the present invention is that it allows distribution or partition coefficients to be evaluated over a much wider range than hitherto been possible with discontinuous centrifuge systems and also permits extractive separation of highly active radionuclides. The system can make use of lead-shielded discontinuous centrifuges. However, we have found it to be advantageous to make use of a centrifuge vessel of polyethylene and to provide a sampling tube of the same material. The stopper for the top of the centrifuge tube may likewise be composed of polyethylene while the plug temporarily closing the end of the sempling tube is advantageously constituted of polytetrafluoroethylene or a metal coated therewith.

DESCRIPTION OF THE DRAWING

The above and other objects, features and advantages of the present invention will become more readily apparent from the following description reference being made to the accompanying drawing in which.

SPECIFIC DESCRIPTION

Figure 1:
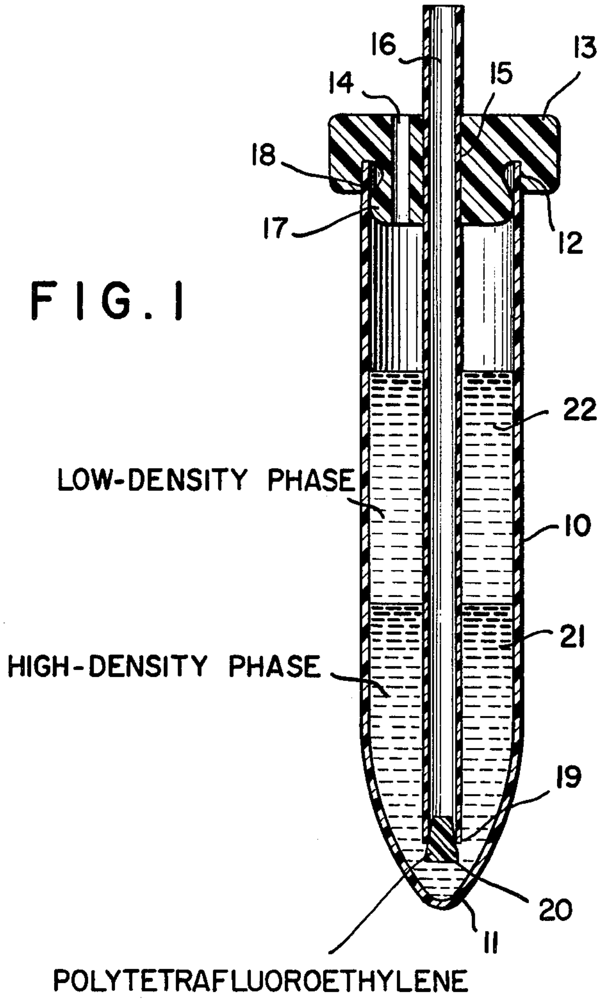
FIG. 1 is a vertical cross-sectional view through a centrifuge vessel embodying the present invention, prior to centrifugation.
Figure 2:
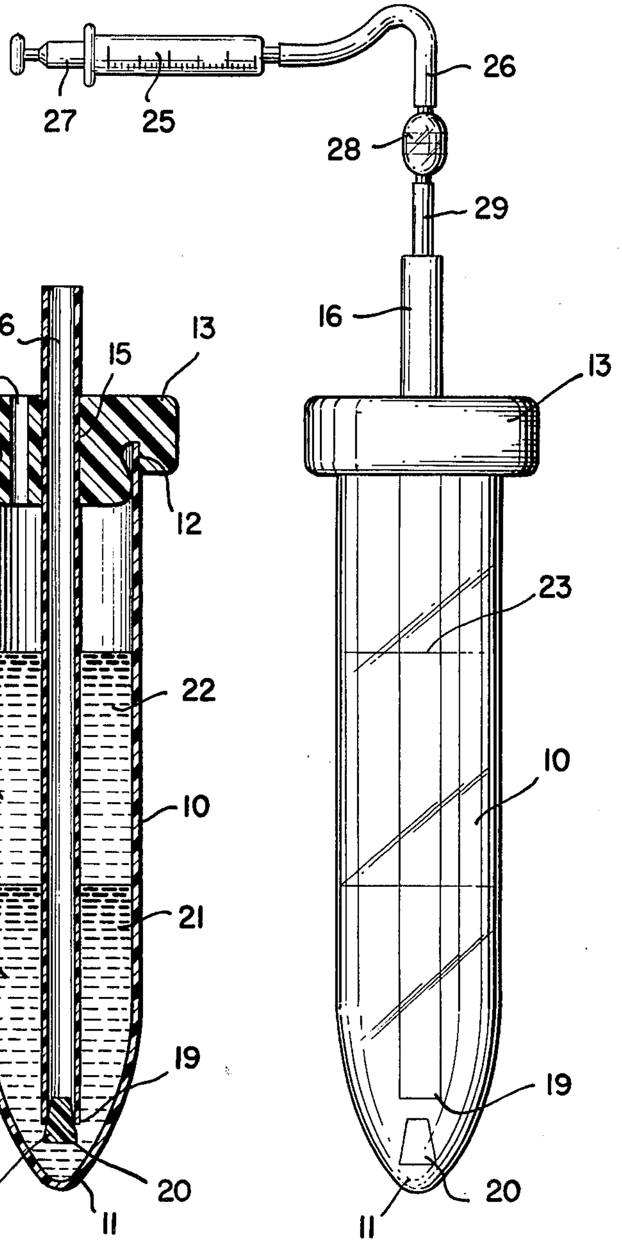
FIG. 2 is an elevational view of the device after the final centrifugation.

In the drawing, we show a centrifuge vessel 10 having a tapered bottom 11 and an open mouth 12 which can be closed by a stopper 13, the latter having a bore 14 through which a sample may be taken of the upper liquid layer. In a hole 15 at the center of the stopper, there is received a polyethylene sampling tube 16 having a lower end or mouth closed by the plug 20 which is composed of polytetrafluoroethylene (TEFLON). The stopper 13 is provided with a boss 19 hugging the interior of the centrifuge vessel 10 and a recess 18 which can hug the outer surface thereof.

The vessel 10 is shown to have a low-density phase 22 overlying the high-density phase 21.

Figure 3:
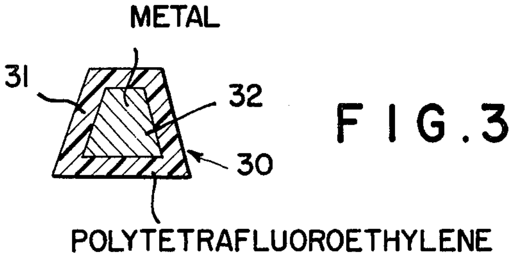
FIG. 3 is an enlarged cross-sectional view through the plug according to the present invention.

As illustrated in FIG. 3, the plug 20, adapted to be centrifugally ejected from the sampling tube 16, may be provided with a slight taper and, for the plug 30, has a lead or steel core 32 coated with polytetrafluoroethylene (TEFLON) at 21. A polytetrafluoroethylene plug is substantially not wetted by the liquid and thus, when the tube 16 with its plug 20 is inserted into the vessel 10, there is practically no mixing of the two phases. During centrifugation, the plug 20 is cast out of the tube 16 so that the lower phase liquid can rise in the tube 16 to the location indicated at 23. To remove an aliquot of the lower phase, a pipette tip 24 which is removably and discardably mounted in the pipetting device 25 with its tube 26, is inserted and the liquid withdrawn. The pipetting device in this case is a syringe whose plugger 27 can be drawn out to induce the flow of lower-phase liquid into the pipette to the index mark 28.

SPECIFIC EXAMPLE

The device of the present invention is used to determine the distribution of partition coefficients of practically carrier-free strontium-90/yttrium-90 between hydrochloric acid or nitric acid solutions or mixtures of carbon tetrachloride with methylsobutylketone. Results were obtained which were reproducible to $1\times10^{-5}$. The decontamination factor for the high-density phase was greater than or equal to $10^5$.

The phases were mixed in the centrifuge vessel by agitation in a vibrator and the vessel was then introduced into a centrifuge with an acceleration above 10,000 G. An aliquot was then taken of the upper phase by a pipette system having a filter to avoid contamination and the entry of solvent vapors into the pipette system. Thereafter, the stopper 13 with tube 16 and plug 20 were inserted into the vessel and the system subjected to a second centrifugation at the acceleration set forth above. The plug 20 is thereby dislodged. The aliquot of the high-density phase was then taken with a disposable tip pipette whose thin tube may be composed of polyethylene. It was possible, using the discontinuous method described above, to detect distribution coefficients within range $10^{-5}$ to $10^5$ with radionuclides having an activity no greater than 10 microcuries. The device has also been found to be highly satisfactory for substances which are long-lived radionuclides and/or which achieve equilibrium slowly.

We claim:

1. A device for the centrifugal separation of phases in a liquid/liquid extraction process, comprising an elongated centrifuge vessel having a closed end and an open end, a stopper removably received in said open end, a sampling tube extending through said vessel and having an open end proximal to said closed end of said vessel and another open end at said stopper, and a plug received in said open end of said tube proximal to said closed end of said vessel and dislodgeable from said tube upon centrifugation of said vessel.

2. The device defined in claim 1 wherein said plug has at least a surface formed by polytetrafluoroethylene.

3. The device defined in claim 2 wherein said plug has a metal core and a coating of polytetrafluoroethylene on said core.

4. The device defined in claim 2 wherein said plug is composed of polytetrafluoroethylene.

5. The device defined in claim 2 wherein said stopper and said tube are composed of polyethylene.

6. The device defined in claim 5, further comprising a pipette system communicating with said tube.

7. The devide defined in claim 5, further comprising a centrifuge receiving said vessel for accelerating same at a centrifugal force sufficient to dislodge said plug from said tube.

8. A method of separating liquid phases of a liquid/liquid extraction mixture comprising the steps of centrifugally separating said mixture into a plurality of phases, inserting a plugged tube below one of said phases and into another phase, and centrifugally dislodging the plug of said tube to communicate between said tube and said other phase.

9. The method defined in claim 8, further comprising the step of withdrawing an aliquot from said other phase through said tube.

10. The method defined in claim 9 wherein said mixture is formed in a centrifuge tube and said one of said phases is sampled after an initial centrifugation.

* * * * *